July 18, 1950

G. N. SMITH

2,515,272

FILM ADVANCE AND SHUTTER RESET

Filed June 16, 1947

INVENTOR
Gordon N. Smith
BY
ATTORNEY

July 18, 1950  G. N. SMITH  2,515,272
FILM ADVANCE AND SHUTTER RESET
Filed June 16, 1947   6 Sheets-Sheet 2

INVENTOR
Gordon N. Smith
BY
ATTORNEY

July 18, 1950  G. N. SMITH  2,515,272
FILM ADVANCE AND SHUTTER RESET
Filed June 16, 1947  6 Sheets-Sheet 3

INVENTOR
Gordon N. Smith
BY
ATTORNEY

July 18, 1950      G. N. SMITH      2,515,272
FILM ADVANCE AND SHUTTER RESET Filed June 16, 1947      6 Sheets-Sheet 4

INVENTOR
Gordon N. Smith
BY
ATTORNEY

July 18, 1950 G. N. SMITH 2,515,272
FILM ADVANCE AND SHUTTER RESET
Filed June 16, 1947 6 Sheets-Sheet 5

INVENTOR
Gordon N. Smith
BY
ATTORNEY

Patented July 18, 1950

2,515,272

UNITED STATES PATENT OFFICE 2,515,272

FILM ADVANCE AND SHUTTER RESET

Gordon N. Smith, Portland, Oreg., assignor to Stereocraft Engineering Co., Portland, Oreg., a partnership Application June 16, 1947, Serial No. 754,963

15 Claims. (Cl. 95—18)

The present invention relates to film advancing and metering mechanism particularly adapted for use in stereoscopic cameras but having some features of value to ordinary cameras suitable for taking single pictures. In the taking of stereoscopic pictures, a pair of lens assemblies are operated simultaneously to produce a matched pair of photographs of the same subject, the photographs having spaced relationship to each other as determined by the spacing of the lens assemblies. In this fashion each lens assembly produces a picture corresponding to the vision of an individual eye of a pair of human eyes so that when the resulting pair of photographs is viewed in a stereoscopic viewer, the sense of depth is created and so that the effect of a three-dimensional picture is obtained. For various reasons, including efficient film consumption, I prefer that the lens assemblies of a stereoscopic camera be spaced from each other at such a distance that the two views produced thereby on a strip of film are separated by a length of film equal to one of the views, plus margins. Thus, on the first exposure, the first and third frames of a film strip will be exposed, leaving the second frame unexposed.

An object of my invention is to provide a method and means for exposing the entire film strip without film wastage or overlapping of views. In order to achieve this object, means are provided for advancing the film alternately one and three frames. Thus, the first exposure will expose frames Nos. 1 and 3; the second exposure will expose frames Nos. 2 and 4; the third exposure will expose frames Nos. 5 and 7; the fourth exposure will expose frames Nos. 6 and 8, and so on alternately advancing the film one and three frames until the entire strip is exposed or the desired number of pictures taken. This picture sequence is well known in the art.

A further object of the present invention is to provide means in a daylight loading stereoscopic camera of the type wherein a film cartridge is placed in the camera and a leader portion of the film exposed while loading whereby the entire exposed leader is advanced beyond the exposure area prior to the taking of the first exposure. In a camera wherein the lens assemblies are separated by a distance such that an unexposed frame will remain between the two exposed frames, this leader strip necessarily will be greater than three frames in length.

An object of the present invention is to provide a camera having means for alternately advancing the film one and three frames during normal stereoscopic exposures, and means for advancing more than three frames during the loading operation to assure the first exposure falling entirely upon unexposed film.

A further object of the present invention is to provide a stereoscopic camera having means for alternately advancing one and three frames during the normal exposure operations, with means to assure the operator that the first film advance, after loading the camera and taking the first pair of pictures, will be one frame in length rather than three frames for efficient film consumption.

A further object of the present invention is to provide means to measure or meter the film accurately during advancing movements so that none of the exposures will overlap.

A further object of the present invention is to provide a stereoscopic camera with manual means including a reset knob for advancing the film coupled with the shutter resetting mechanism, the reset knob being uniformly rotatable to the same extent during each resetting operation whether the film is advanced one frame or a plurality of frames.

A further object of the present invention is to provide a stereoscopic camera with a single selector mechanism by means of which the operator can direct the automatic functioning of any one of several camera functions including: first, measuring of the exposed film leader to insure that it will be advanced past the exposure area after loading fresh film in the camera; second, achieving normal stereoscopic sequence of film advance whereby the film is advanced alternately one frame and a plurality of frames for economical film consumption; third, achieving disengagement of the film advancing mechanism during a resetting operation to permit resetting of the camera without advancing the film between exposures whereby the camera may be utilized as an ordinary camera for taking single pictures, and for intentional double exposures; and fourth, achieving disengagement of both the advancing mechanism and a snubbing device, normally preventing film rewinding, so that when desired the exposed film may be rewound into the film magazine. Coupled with the foregoing object is the object of providing a stereoscopic camera which may be used at will as a stereoscopic camera for taking matched pairs of exposures or as an ordinary camera for taking single exposures, permitting the operator to intersperse stereoscopic views with ordinary views without wasting film.

A further object of the present invention is to provide means including a shutter mechanism for making exposures, and an escapement mechanism for timing the exposures by controlling the shutter mechanism, both coupled with film advancing means which may be operated concurrently with the resetting of the shutter mechanism, or at will may remain inoperative to permit resetting of the shutter mechanism without film-advancing movement.

A further object of the present invention is to provide a film measuring mechanism operatable during resetting of the camera after an exposure to advance accurately measured quantities of film in units of length suitable for taking stereoscopic or single pictures without overlapping of the frames.

A further object of the present invention is to provide a resetting mechanism associated with a film advancing mechanism through a clutch including a positively engaging coupling member movable from driving to idling position or vice versa at various portions of the cycle of operation of the resetting mechanism as determined by the setting of a selector mechanism.

The foregoing and other objects and advantages of the present invention will be more readily apparent from an inspection of the following specification taken in conjunction with the accompanying drawings wherein like numerals refer to like parts throughout.

Figure 4:
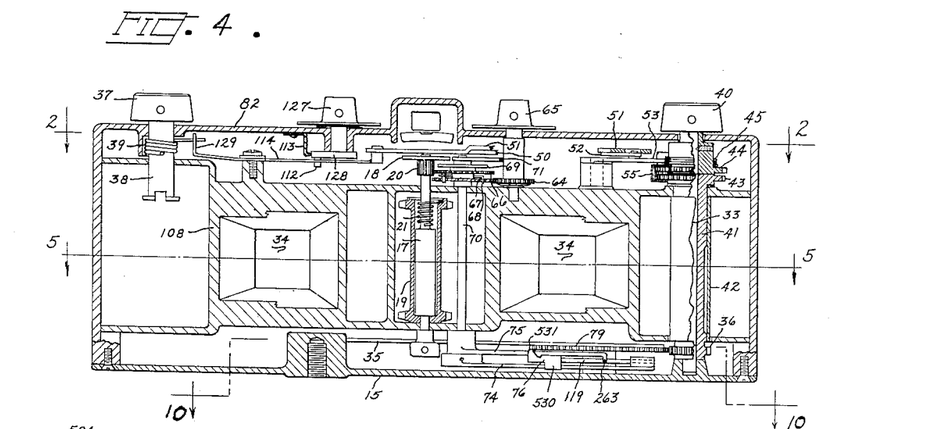
Fig. 4 is a vertical section taken substantially along the line 4—4 of Fig. 5.
Figure 5:
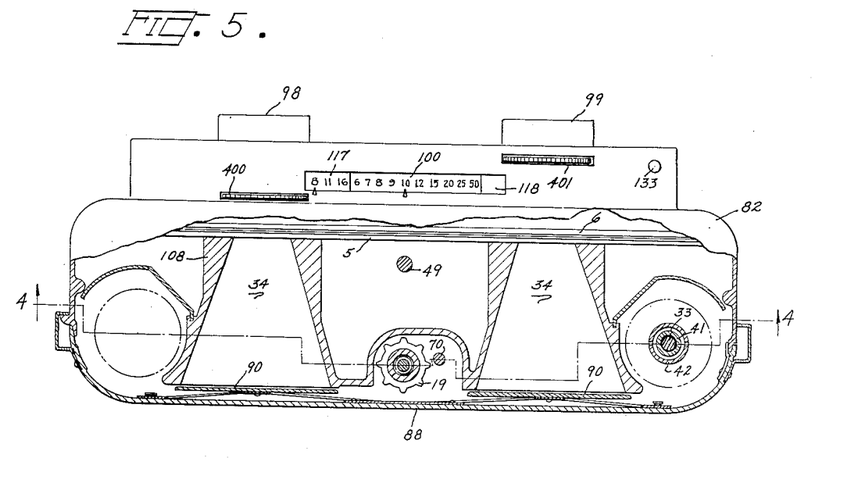
Fig. 5 is a horizontal section taken substantially along the line 5—5 of Fig. 4.

The camera comprises a case 82 having a removable rear cover 88 held in position by suitable releasable means such as indicated in Fig. 5. The case 82 preferably comprises a removable rigid bottom 15 which may be separately molded and machined, whereas the balance of the case preferably comprises a molded unit attached by screws to the bottom 15 as indicated in Fig. 4. The interior of the camera preferably comprises a frame 108 (Figs. 4 and 5) suitably associated with the bottom 15 by any convenient fastening means (not herein disclosed), the frame including surfaces defining a pair of horizontally spaced light tunnels 34 adapted to transmit light to the film, when permitted to do so by the camera shutters, from a pair of lens assemblies 98 and 99. Strip film is fed past the light tunnels and held in proper relation to the lenses by suitable guiding surfaces at the rear of the frame 108 against which the film is pressed by pressure pads 90 resiliently mounted upon leaf springs fastened to the inner surface of the removable cover 88. The film is adapted to be placed in the camera while rolled within the conventional light-tight cartridge which may be placed in the cartridge cavity at the left end of Fig. 4, and is adapted to be wound on the film spool at the right end of Fig. 4. After exposure of the desired number of frames the film may be re-wound into the cartridge, the rear cover 88 removed and the film cartridge removed.

Figure 9:
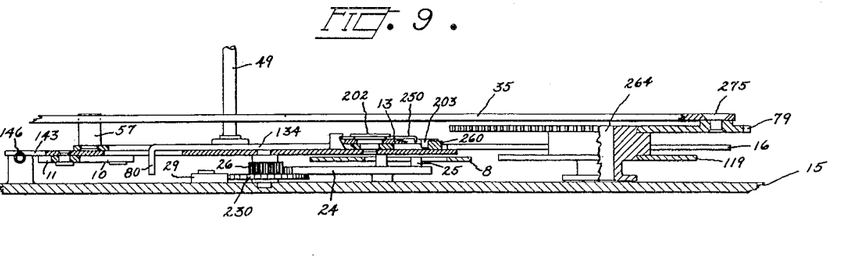
Fig. 9 is a vertical section taken through the shutter controlling and reset mechanisms substantially along the line 9—9 of Fig. 10.
Figure 10:
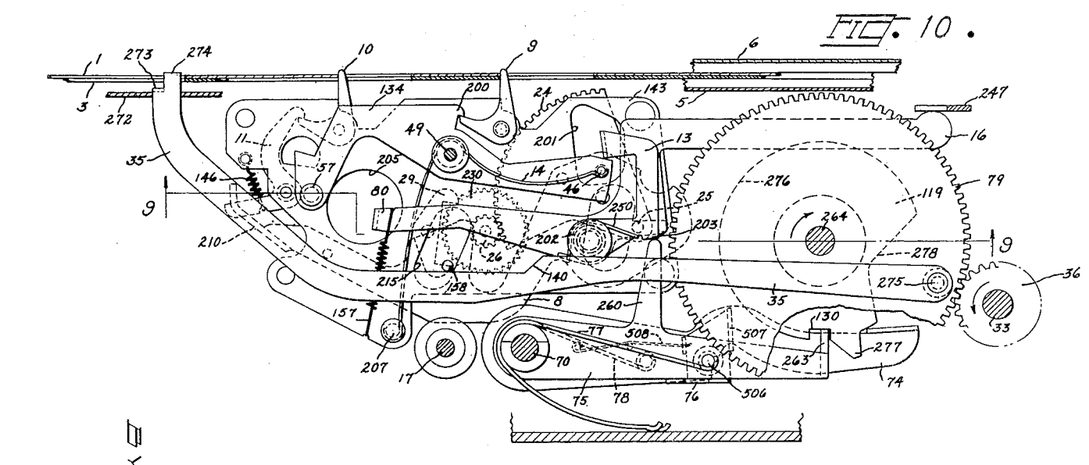
Fig. 10 is a plan view of the mechanism disclosed in Fig. 9 taken substantially along line 10—10 of Fig. 4.

As more fully disclosed in my co-pending application, Serial No. 754,961, filed June 16, 1947, the present invention is particularly adapted to be associated with a stereoscopic camera having shutter controlling means including exposure timer mechanism (not shown) and reset mechanism as more particularly disclosed in Figs. 9 and 10 hereof. The shutter controlling means is especially adapted to control shutters as disclosed in Figs. 13 to 16 hereof. An exposure as initiated by depressing a trip button 133 protruding from the right front corner of the upper surface of the case. The timing of the exposure is controlled as more particularly described in the aforesaid application and the duration of exposure will be indicated on an exposure speed dial 141 visible through a window 144 and having indicia movable past a pointer 226 as the exposure speed control knob 142 is rotated.

Figure 1:
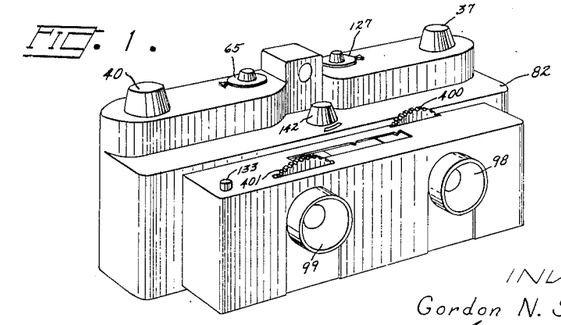
Fig. 1 is a perspective view of a stereoscopic camera embodying the present invention.
Figure 2:
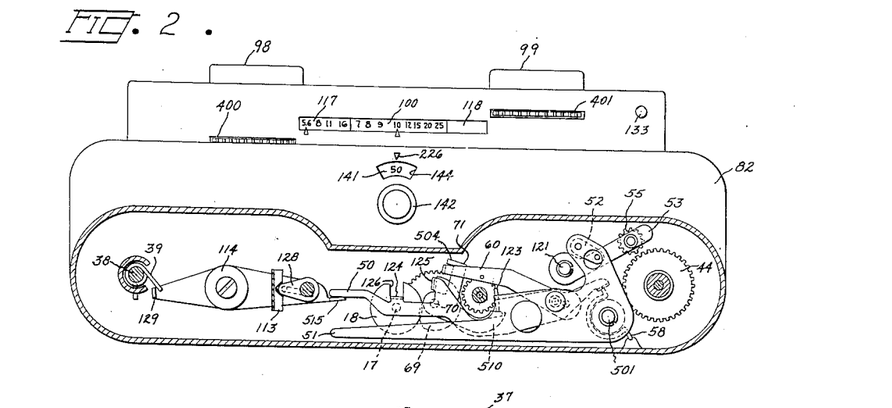
Fig. 2 is a sectional view of the camera taken substantially along line 2—2 of Fig. 4 and illustrating the positions of certain parts when the selector control is set to expose the film for stereoscopic pictures.
Figure 3:
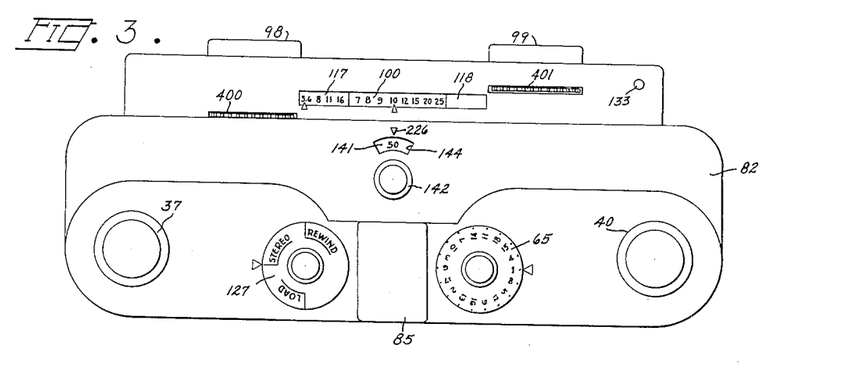
Fig. 3 is a plan view of the camera with the selector control set at "Stereo" position corresponding to the setting of the parts disclosed in Fig. 2.

In order to control the amount of light permitted to strike the film for an exposure, the lens assemblies 98 and 99 are preferably provided with adjustable iris diaphragms adjustable simultaneously and coextensively by rotating a diaphragm adjusting wheel 400 protruding through a slot in the upper surface of the case as disclosed in my copending application, Serial No. 754,962, filed June 16, 1947. Adjustment of the irises is accompanied by simultaneous movement in opposite directions of a stop scale 117 visible at the left end of a central window and a shield 118 visible at the right end of the same window, which define therebetween the depth of field for the particular diaphragm and focus adjustments. The focus adjustment of the lens assemblies 98 and 99 is accomplished by rotation of a focus adjusting wheel 401 which moves a focus scale 100 past an indicator on the case. In the accompanying drawing, Figs. 2 and 3 show that the lenses have been set for sharp focus at 10 feet, the stop setting is f/5.6, and the depth of field is substantially 6½ feet to 30 feet. In Fig. 5 the lenses have been set to have sharpest focus at 10 feet, and the diaphragms adjusted for a stop setting of f/8, thereby increasing the depth of field to 5½ feet minimum to 60 feet maximum. The mechanism for accomplishing the adjustments and moving the indicating members to indicate focus, diaphragm and depth of field values is more fully disclosed and claimed in the aforesaid application, Serial No. 754,962.

Figure 14:
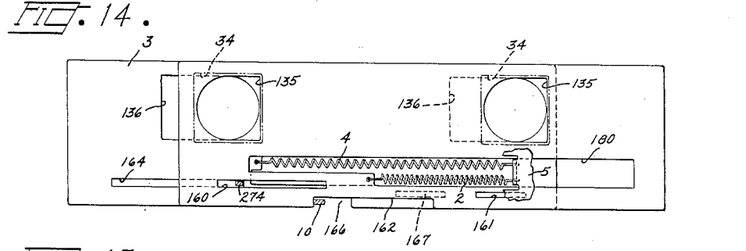
Fig. 14 is a similar view showing one shutter released to initiate an exposure.

Figs. 13 to 16 inclusive disclose the preferred form of exposure controlling means comprising a pair of superimposed shutter blades 1 and 3 guided between members 5 and 6 (Fig. 10) and movable during exposure by the associated springs 2 and 4 located in the slots 180 and 181. The front shutter 1 is provided with a pair of apertures 135 having their left ends rounded and the rear shutter 3 is provided with a pair of apertures 136 having their right ends rounded. When the apertures are suitably aligned with the small end of the light tunnels 34 as seen in Fig. 14, maximum light intensity is permitted to strike the film. Shorter exposures may be achieved by releasing both shutters simultaneously, or substantially so, in which case the vertical slots formed by the overlapping ends of the apertures 135 and 136 as disclosed in Fig. 13 will flash by the light tunnels and permit minimum or variable short exposures of the film. When the shutters are in "Set" position as disclosed in Fig. 13 the front shutter 1 obscures the light tunnels even though the apertures 136 are aligned therewith, and at completion of an exposure (Fig. 15) the rear shutter 3 obscures the light tunnels even though the apertures 135 are aligned therewith.

Figure 15:
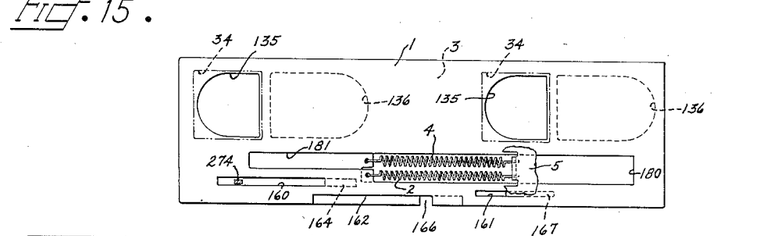
Fig. 15 is a similar view showing both shutters released to terminate the exposure.
Figure 16:
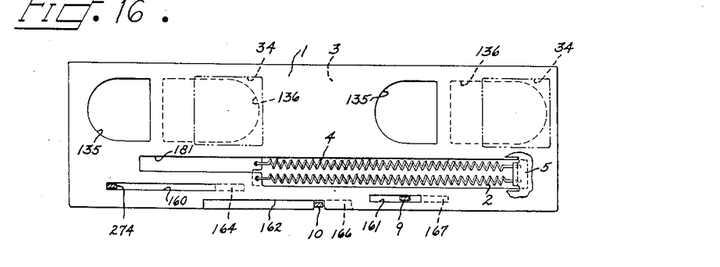
Fig. 16 is a similar view showing the shutters in the course of being moved back to the "Set" position disclosed in Fig. 13.

The shutters are of substantially the same size and weight and are tensioned by springs of substantially the same effective strength against substantially the same resistance so that they move at substanially the same speed. The springs 2 and 4 extend from an ear 191 (Fig. 13) struck from the guide 5 and lie within slots 180, one of which has a suitable extension 181 permitting movement of each shutter blade independently of the other without frictional resistance of the springs. The shutters are movable from the "Released" position of Fig. 15 to the "Set" position of Fig. 13 by a finger 274 on a reset lever 35 (Fig. 10) which engages a pair of superimposed slots 160 and 164 and which is guided for rectilinear movement by a tab 273 engaging a guide rail 272. Upon reciprocation of the finger 274 toward the left the shutters are moved to the position disclosed in Fig. 16, in which a primary latch 9 may engage in superimposed slots 161 and 167 and a secondary latch 10 may engage in superimposed edge notches 162 and 166. The latches 9 and 10 are controlled by the timer and escapement mechanism disclosed in Figs. 9 and 10 so that after the finger 274 is retracted the primary latch 9 holds both shutter blades in the position disclosed in Fig. 13. Secondary latch 10 normally does not engage either shutter but is held in position to engage blade 3 if desired. If the mechanism is set for an instantaneous exposure of shortest possible duration, the secondary latch 10 is released prior to release of the primary latch 9 in which event the shutters will flash past the lenses and the exposure will be such as achieved by the amount of light traversing the vertical slots formed by the blades as the slots flash past the light tunnels. If a high speed exposure of variable extent is desired, the latch 10 is held in latching position for an adjustable period of time after release of latch 9. Means for effecting a long exposure operation is disclosed in Fig. 14 wherein it is seen that blade 1 has come to rest and blade 3 has not started to move. Upon release of latch 10 at the duration of the timed interval, blade 3 completes the exposure as seen in Fig. 15. Likewise, if a manually controlled time exposure is desired, the latch controlling mechanism is so set that upon depression of the trip button 133, blade 1 moves to "Released" position but blade 3 will be held and permitted to move only when the button 133 is released. The exposure timing and latch releasing mechanism is more fully disclosed and claimed in my aforesaid application, Serial No. 754,961.

The present invention is concerned with means whereby the film may be properly positioned in the camera for the initial exposure, and means whereby successive exposures may be made without overlapping or film wastage, whether the camera be used as a stereoscopic camera for taking matched pairs of pictures or as a conventional camera for taking single pictures.

Although all of the mechanism described in the succeeding pages is interrelated, various portions thereof will be described separately so as to clarify the operation of the invention.

Figure 6:
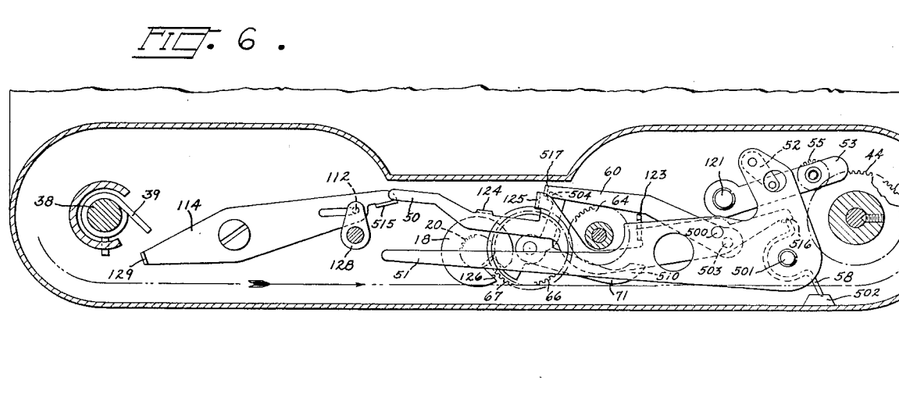
Fig. 6 is an enlarged sectional view corresponding to Fig. 2 showing the parts in certain positions assumed at one time when the selector control is set to the "Load" position.

*Loading.*—The back cover 88 may be removed and the conventional film cartridge placed in the cartridge cavity at the left end of the camera. A rewind knob 37 is positioned above the cartridge cavity and is fixed to the end of a rewind shaft 38 which is suitably journalled in the case 82 and frame 108. A snubbing spring 39 is disposed about the shaft 38 in the space between the cover and the frame, the lower end of the spring being laterally disposed and hooked into engagement with a depending portion of the case 82 (Fig. 2). The upper end of the spring extends laterally from the shaft in position to be engageable by an upstanding tab 129 on a selector arm 114 pivotally mounted on a boss rising from the upper surface of the frame 108. The rewind shaft 38 may be axially shifted to engage or disengage the film cartridge in conventional manner. Normally the spring 39 hugs the shaft 38 and prohibits its rotation in a clockwise direction, the spring tension being such, however, that the shaft will readily rotate counterclockwise when the film is being unwound from the cartridge. When the selector lever 114 is moved to another position, such that the tab 129 engages the projecting end of the spring and unwinds the spring from the shaft a certain amount, the shaft may be turned freely in either direction or moved axially without restraint from the spring. Movement of the selector lever 114 is accomplished by means of a pin 112 projecting from a crank 128 into a slot in the lever, the crank being fixed to a selector knob 127 projecting above the cover and having a dial thereon movable past a pointer, the dial being marked with the words "Load," "Stereo," and "Rewind." When the dial is rotated to place the word "Rewind" in proper relationship to the index point, henceforth to be called the "Rewind" position, the crank moves the lever 114 to the position illustrated in Fig. 7 whereupon the shaft 38 may be retracted to permit insertion of the cartridge and then depressed to engage the cartridge. The protruding end of the film is then drawn past the rear ends of the light tunnels and engaged in a slot through a spool shell 42 fixed about the intermediate portion of a film spool 41 rotatably journalled on a reset shaft 33 extending through the film receiving cavity at the right end of the frame 108. Under certain conditions, to be explained later, the spool 41 may be rotated counterclockwise by turning a reset knob 40 fixed to reset shaft 33. Reset shaft 33 is permanently held against major clockwise rotation by a snubbing spring 45. After positioning the end of the film in engagement with the spool, the rear cover 88 is repositioned and the selector knob 127 set to "Load" (Fig. 6). The reset knob 40 is then rotated as far as possible in a counterclockwise direction. This advances the film more than three frames, thus winding all of the exposed leader onto the film spool and presenting unexposed film to the light tunnel areas. When the film is thus loaded, it is suitably guided past the rear openings of the light tunnels and held against the rear surface of the frame 108 by the pressure pads 90 and held in proper relationship to the lens assemblies 98 and 99. It is to be remarked that the distance between the light tunnels 34 is such that a single frame will remain unexposed when positioned there.

The film suitable for the camera herein illustrated is preferably 35 millimeter film having two perforation tracks along its edges; but the invention is not to be limited to this size or to this type of film as variations in film may be accommodated by suitably varying the dimensions or otherwise modifying the film advancing and metering mechanism. In the preferred form the perforations in the film engage sprocket teeth extending from the top and bottom of a sprocket 19 (Fig. 4) journalled upon a sprocket shaft 17 extending vertically through the intermediate portion of the frame 108 and having a sprocket shaft pinion 20 and a sprocket cam 18 at its upper end. A snubbing spring 21 having one end fixed to the sprocket 19 and its other end wrapped about the sprocket shaft permits the sprocket 19 to turn clockwise without turning the shaft 17, but enables sprocket 19, when rotated counterclockwise, to turn the shaft 17. Thus, when the film is held in engagement with the sprocket teeth by the pressure pads 90, counter-clockwise rotation of the film spool 41 to advance the film will rotate the cam 18, while clockwise rotation of the rewind shaft 38 to rewind the film into the film cartridge will not rotate cam 18.

Winding movement of the spool 41 is accomplished by turning the resent knob 40 and shaft 33 to which it is fixed counter-clockwise, when a clutching mechanism is engaged. The clutching mechanism comprises a gear 44 fixed to the shaft 33 and a smaller toothed gear 43 on the upper end of the spool 41 and rotatable with respect to the shaft 33, simultaneous rotation of the two gears being accomplished through a clutch pinion 55 when it is moved into engagement with the teeth of the gears 43 and 44. The gear 43 is held from being turned by the spring effect of the film by a friction washer interposed between the gear 43 and frame 108. The clutch pinion 55 is mounted upon a clutch pinion lever 53 pivoted on a stud 121 extending upward from the frame 108, said pinion being movable from and into clutching position by a clutch lever 51 pivoted on a stud 501, and driving clutch pinion lever 53 through a connecting toggle link 52. Clockwise rocking of clutch lever 51 causes the clutch pinion 55 to move into engagement with the gears 43 and 44, henceforth called "engaging the clutch" whereas counterclockwise rocking of clutch lever 51 causes the clutch pinion 55 to move out of engagement with gears 43 and 44, henceforth called "disengaging the clutch." Gear 44 is preferably provided with longer teeth than gear 43 to assure engagement of clutch pinion 55 with both gears substantially immediately upon movement thereof into clutching position, since if the gear teeth are not aligned, clutch pinion 55 will turn gear 44 a fraction of a tooth width and then engage gear 43. Movement of clutch lever 51 is effected in two ways; first, by the selector lever 114; and second, by a spring 58.

Figure 7:
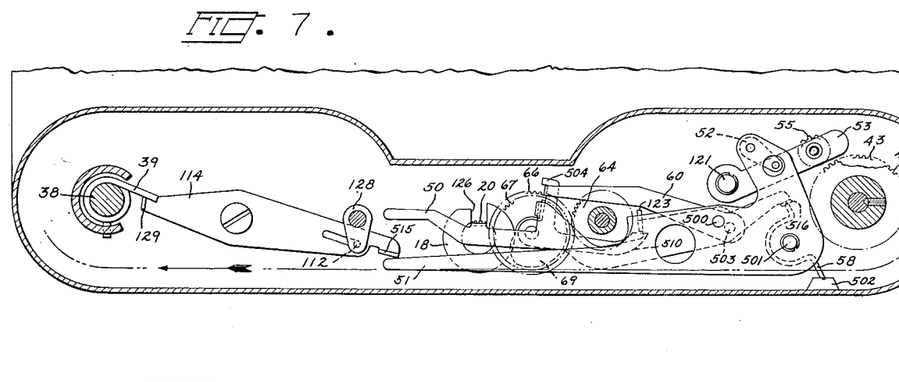
Fig. 7 is a view similar to Fig. 6 showing the parts in certain positions assumed when the selector control is set to the "Rewind" position.

*First manner of moving the clutch lever 51.*— An upbent ear 515 on the right end of selector lever 114, Fig. 2, is arranged to engage either clutch lever 51 or clutch index 50 when the selector lever 114 is rocked by crank pin 112 engaging its slot (Figs. 6 and 7). Crank pin 112 is fixed to a selector knob crank 128 journalled in case 82 and externally adjustable by the selector knob 127. When the dial is set to "Rewind," the crank 128 and selector lever 114 are positioned as in Fig. 7, with ear 515 bearing on clutch lever 51 whereby the clutch is disengaged. If the dial were now set to "Stereo," crank 128 and selector lever 114 would be positioned as shown on Fig. 2, and clutch lever 51 could remain in its counterclockwise position as shown or be moved clockwise by cooperating elements as described later.

*Second manner of moving the clutch lever 51.*— A clutch index 50 is pivoted at 500 to the lower surface of clutch lever 51, said index carrying a bent-down tab 124 designed to align with a notch 126 in the sprocket cam 18, a second bent-down tab 125 aligning with an auxiliary cam 69 and a third tab 123 with portions extending both above and below clutch index 50. That portion of tab 123 extending upwardly may strike clutch lever 51 as shown in Figs. 2 and 7, thereby limiting the counter-clockwise rotation of index 50 with respect to clutch lever 51. That portion of tab 123 extending downwardly may strike a fulcrum lever 60 pivoted at 503 on a stud projecting from the frame 108. A fourth tab 516 is bent down from index 50 and is cupped to receive the end of compression spring 58 which is tensioned to urge the index 50 counter-clockwise about its pivot 500.

The line of thrust of the spring 58 is to the right of the stud 501 so that the spring 58 tends to rock the clutch lever 51 counter-clockwise about stud 501. The line of thrust and the position of the pivot points are chosen to give a predetermined ratio of torques to the index 50 and the clutch lever 51 for proper operation as will be apparent later in my disclosure.

When the selector 114 is in its inoperative position at "Stereo," spring 58 urges both the index 50 and the clutch lever 51 counter-clockwise, and, if the notch 126 in the cam 18 and the reduced portion of cam 69 align with the tabs 124 and 125 and an extension 510 of a regulating lever shaft stop 71 does not interfere with tab 123, then the index 50 and the clutch lever 51 will rock counter-clockwise as a unit to the position shown in Fig. 2 with the clutch disengaged.

Figures 8, 11:
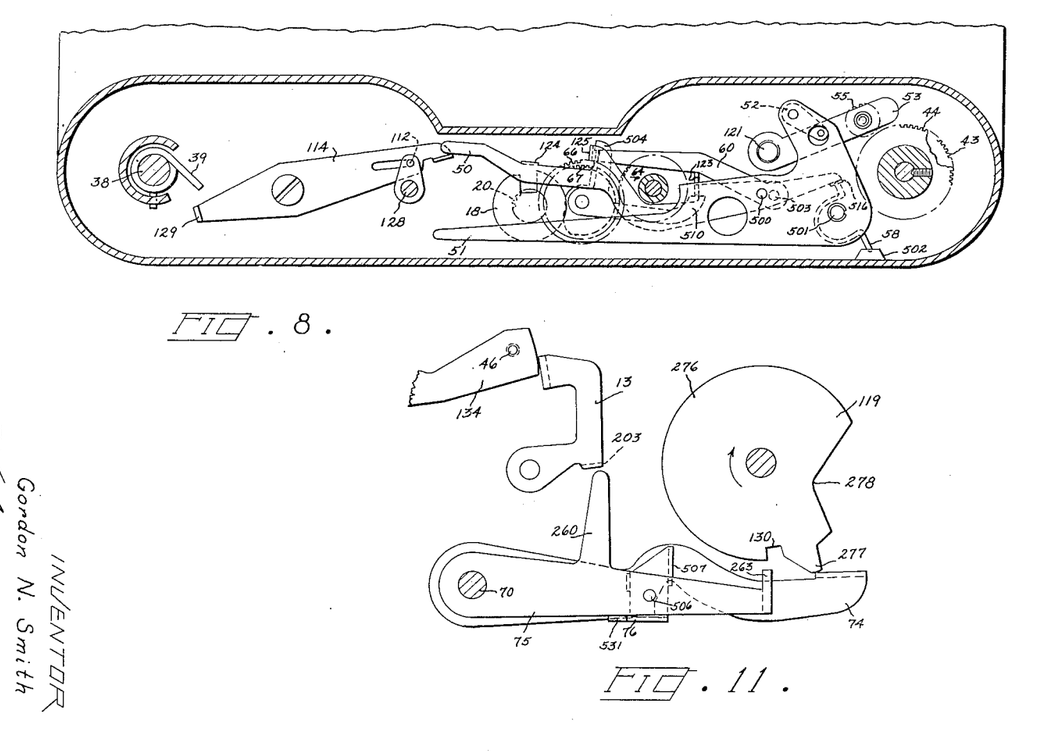
Fig. 8 is a view similar to Fig. 6 showing the parts in certain position assumed at another time when the selector control is set to the "Load" position.
Fig. 11 is a partial view of the mechanism disclosed in Figs. 9 and 10 at another stage of operation.

Regulating lever stop 71, fixed to a regulating lever shaft 70 is urged in a counter-clockwise direction by a regulating lever spring 78 hooked to a stud in a regulating lever 74 fixed to the lower end of regulating lever shaft 70 as shown in Fig. 10. The other end of spring 78 bears against a portion of the frame 108 causing regulating lever 74 normally to ride on the irregular surface of a regulating cam 119. When cam 119 is caused to rotate about its axis 264, as will be explained later, spring 78 urges regulating lever 74 counter-clockwise as the radius of the cam 119 becomes smaller, and the cam moves the lever clockwise as the radius of the cam 119 becomes greater. This action as transmitted to regulating lever shaft stop 71 through shaft 70 is a necessary part of the film advancing cycle in both the "Stereo" and the "Load" positions of the selector lever 114. In the "Load" position, this action permits the clutch lever spring 58 to move the clutch lever 51 in this manner:

With the selector lever 114 at the "Load" position as shown in Fig. 8, the index lever 50 is rocked clockwise to the position shown. In so doing, tab 123 strikes fulcrum lever 60, pivoted on a stud 503 projecting from the surface of the frame 108, said lever 60 having its free end bent over at 517 (Fig. 6) and hooked by an extension 504 on regulating lever stop 71. Because the fulcrum 60 is so hooked, it cannot yield to the pressure of tab 123 and continued clockwise movement of index 50 by selector lever 114 forces index 50 to rock about the tab 123, depressing the index lever pivot 500 and rocking clutch lever 51 counter-clockwise against the tension of clutch spring 58. (This is also the first manner of moving the clutch lever 51.) This counter-clockwise movement of clutch lever 51 disengages the clutch pinion 55 from the clutch gears 44 and 43. If the regulating lever stop 71 is now rocked clockwise by causing the ear 277 of cam 119 to pass under regulating lever 74, the hook 504 will release the free end of fulcrum lever 60, and fulcrum lever 60 will yield to the pressure of index tab 123 resulting from the tension of clutch spring 58. In so yielding, the fulcrum lever 60 will permit tab 123 to follow it and clutch lever spring 58 pushes cup 516 and pivot 500 to rock clutch lever 51 clockwise (Fig. 6). This clockwise rocking of clutch lever 51 causes the clutch pinion to bear on clutch gear 44, and, if properly aligned, engage the teeth of both gear 44 and gear 43. Therefore, the clutch spring 58 moves the clutch lever 51 during the "Load" cycle. Also, the lever 114 moves the clutch lever 51 during the "Load" cycle. As explained above, the regulating lever stop 71 moves the clutch lever 51 through the action of spring 58 during the "Load" cycle. It also moves the clutch lever through the action of the spring 58 during the "Stereo" cycle. With the selector lever 114 in the "Stereo" position as in Fig. 2 and the regulating lever 74 bearing on the regulating cam as in Fig. 10 the extension 510 of lever 71 cannot touch ear 123 of index lever 50. However, if cam 119 is rotated to permit regulating lever 74 to ride into the wide notch 278, regulating lever spring 78 will rock regulating lever 74 counter-clockwise into notch 278, and in so doing will rock regulating lever stop 71 counter-clockwise sufficiently far to cause tail 510 to contact tab 123 and push it against the lesser tension of clutch spring 58 until index lever tabs 124 and 125 are entirely clear of the cam notch 126 and the cut-away section of cam 69 leaving the cams 18 and 69 free to rotate. The thrust of clutch spring 58 urges the clutch lever 51 to move with the index lever 50 and results in a clockwise movement of clutch lever 51 tending to engage the clutch.

In Fig. 10 it is seen that the shaft 33 will be locked against rotation by tab 263 on a stop lever 75 pivoted upon the regulating lever shaft 70 and urged in a counterclockwise direction by a spring 77. The stop lever tab 263 engages a notch 130 in the cam 119 which is fixed to a gear 79. In order to remove the stop lever tab 263 from locking engagement, an extension 269 thereof engages a tab 203 on a primary latch pawl release lever 13 which is urged in a counterclockwise direction by a spring 250 passed about the lever pivot 202. The tab 203 also engages a shoulder on a release lever 16 which is pivoted at 202 and urged counterclockwise by a spring 157. The trip button 133 rocks a vertically extending trip lever 247 which rocks the release lever 16 clockwise, the tab 203 causing clockwise movement of the primary latch pawl release lever 13 and clockwise movement of the stop lever 75 to disengage it from the cam notch 130. The free end of the lever 13 has a tab extending downwardly to engage the right end of a primary latch pawl 134 pivoted about a timer cam shaft 49, as fully explained in the aforesaid application, Serial No. 754,961. An escapement spring 14, having one end fastened about a stud 207 on the intermediate mounting plate 143, is tensioned about the shaft 49, and has its other end engaged with a pin 46 connecting the pawl 134 to a floating lever 8 which is mounted beneath the plate 143, the pin 46 passing through an opening 201 in he plate. The pawl 134 is provided with a hook 200 which holds the primary shutter latch 9 in holding position. When released by the lever 13, the pawl 134 is driven counter-clockwise by the spring 14, the movement thereof being delayed or regulated by an escapement mechanism including a sector gear 24 having a pin 25 engaged in a slot in the floating lever 8. The sector gear engages a pinion gear 26 fastened to a ratchet 230 adapted to be engaged by the points of a rocking escapement pawl 29. The floating lever 8 is provided with an extension engageable with a timer cam (not shown) and thereby rocked in such manner as to cause the tail 219 thereof to rock a secondary latch release pawl 11 counter-clockwise against the tension of its spring 146 to release the secondary shutter latch 10.

As explained in the aforesaid application, Serial No. 754,961, the mechanism may be so adjusted as to cause release of latch 10 prior to the release of latch 9 for taking an instantaneous exposure, or an infinitely variable fixed time interval after release of latch 9 for taking high speed variably timed exposures, or a manually controllable time after release of latch 9 for taking timed exposures of great length. In the latter case, movement of release lever 16 clockwise does not affect the release of secondary latch 10; this latch is only released when the release lever 16 is returned to initial position by spring 157 and the end thereof strikes a pin 158 extending upward from floating lever 8 through a slot 215 in plate 143.

When any type of exposure is initiated, the pawl 134 moves counter-clockwise and locks the release lever 13 in position against the tension of its spring 250. This action moves the stop lever 75 to a clockwise position out of engagement with the cam 119 against the tension of its spring 77. The counter-clockwise movement of primary latch pawl 134, immediately after its release by pawl release lever 13, brings the arcuate face of primary latch pawl 134 in the path of the ear on lever 13 prohibiting counter-clockwise rotation of lever 13, and locking stop lever 75 out of notch 130. Lever 16 may then be returned to its normal position by the spring 157 upon release of the trip button 133. The stop lever 75 will be held outward until the reset knob is rotated sufficiently to cause an offset 140 on reset crank 35 to engage a pin 57 on the left end of primary latch pawl 134 and rock it clockwise to the position illustrated in Fig. 10 thus permitting the release lever 13 to return to its position illustrated in Fig. 10. A latch 76 pivoted at 506 on stop lever 75, Fig. 10, has three tabs thereon. Tab 530 (Fig. 4) is bent down and hooks over a corner of regulating lever 74. Tab 531 is an extension of tab 530 but projects upwardly to engage the edge of stop lever 75. Tab 507 (Fig. 10) is also bent downwardly, and lies within the radius of the ear 277 of cam 119, so that clockwise rotation of cam 119 causes ear 277 to strike tab 507 and rotate latch 76 counter-clockwise sufficiently for tab 530 to move from engagement with the corner of lever 74. Continued rotation of cam 119 causes the ear 277 to pass out of contact with tab 507, permitting latch spring 508 to rotate latch 76 clockwise until tab 531 again rests against the edge of stop lever 75 and prohibits additional clockwise rotation of the latch 76.

With the selector lever 114 in "Load" position, the ear 277 rocks regulating lever 74 clockwise sufficiently to permit regulating lever stop 71 to unhook fulcrum lever 60 as in Fig. 6, whereupon the bent-down end 517 of fulcrum lever 60 then hooks the stop 71, locking stop 71 against counter-clockwise movement. Because both the stop 71 and the regulating lever 74 are fixed to the shaft 70, the regulating lever 74 is also held against counter-clockwise movement and maintains the position as shown in Fig. 11 even after the ear 277 passes out of contact with lever 74. The stop lever 75 will also be locked against counter-clockwise movement by the latch tab 531 bearing on the corner of regulating lever 74, and will remain so locked until the notch 130 is out of alignment with the stop lever tab 263, and both the notch 130 and the ear 277 have been rotated clockwise to a position where the ear 277 trips the latch 76 by engaging the latch tab 507 and rotating the latch until the tab 531 has disengaged the corner of lever 74. When so disengaged, the corner can no longer hold stop lever 75 against the tension of its spring 78 and the stop lever 75 moves counter-clockwise where it is in position to lock cam 119 against rotation when the notch 130 again aligns with stop lever tab 263.

It will be noted that the cooperation of the regulating cam with the clutch mechanism accomplishes two objectives:

1. The clutch is engaged and the film thereby started to advance at a definite part of the cam rotation (i. e. when the cam ear 277 strikes the end of regulating lever 74 and moves it, and the regulating lever stop 71, clockwise to unhook fulcrum lever 60);

2. After the clutch is engaged, it remains engaged for somewhat more than a full revolution of cam 119 (i. e. the ear 277 moves stop lever 75 out of position to engage the cam notch 130, and does so a fraction of a revolution before normal engagement, and latch 76 does not release stop lever 75 until notch 130 has passed stop lever tab 263). Tab 263 does enter notch 130 and stop the cam rotation when they next align. (Therefore, stop lever 75 is inoperative for somewhat more than a complete revolution of cam 119, and the equivalent spool winding for this cam rotation is sufficient to advance fresh film to both light tunnels.)

*Exposure counter dial and film measuring mechanism.*—As is customary in 35 millimeter cameras, the camera is provided with an exposure counter dial 65 and related mechanism. Means are provided to set the numeral 1 on the dial opposite the fixed indicator on the frame of the camera when the film has been loaded as previously set forth. A secondary object achieved by setting the counter dial is to insure that after the first exposure the film will advance one frame only. When taking stereoscopic pictures, it will be seen that the first and third frames will be exposed on the first exposure; advancing the film one frame will position the second and fourth frames for the second exposure, and the second advancing movement of the film should be for the extent of three frames in order to position the fourth and sixth frames opposite the light tunnels. Thereafter, when taking stereoscopic pictures, the film should be advanced alternately one frame and three frames. Setting the exposure dial to the number 1 after loading the film, when the selector knob 127 is placed at "Stereo" and allowed to remain there, will cause this alternate one and three frame advancing movement to occur in proper sequence.

Before adjusting the position of the exposure counter dial 65, the selector knob 127 is set to place the word "Stereo" opposite the pointer, at which position the selector arm 114 is moved to the position illustrated in Fig. 2. In this position arm 114 contacts neither the clutch lever 51 nor the clutch index 50 and therefore has no effect on the clutch operation. Also, the spring 39 remains in snubbing position. The exposure counter dial 65 is then turned counter-clockwise which, through the medium of the vertical bushing upon which the dial is mounted and the gear 64 fixed to the lower end thereof, rotates clockwise a gear 67 splined to a shoulder on cam 69. Cam 69 is loosely mounted upon the upper end of the shaft 70 (Fig. 4). A spring 68 is hooked into the gear 67, extends partially around the shaft 70 and is hooked over a pin depending from a gear 66 into a 90-degree slot in gear 67. Gear 66 is loosely mounted on a second shoulder of cam 69.

The spring 68 is so tensioned that counter-clockwise rotation of pinion 20 drives through gears 66 and 67 to gear 64 without stressing the spring, but counter-clockwise rotation of dial 65 drives pinion 20 by gears 64, 66, and 67 through the resiliency of the spring, so that locking of pinion 20 by the engagement of index lever tab 124 in sprocket cam notch 126 permits gear 67 to rotate 90° after gear 66 is locked by pinion 20. The tension of the spring normally permits knob 65 to rotate cam 18 without deflecting the spring 68, and it is only after the locking of cam 18 that relative rotation of gears 67 and 66 is possible. The action of the snubbing spring 21 permits the shaft 17 to be rotated counter-clockwise by dial 65 without turning the sprocket 19. Rotation of the pinion 20 in this manner causes rotation of a sprocket cam 18 fixed to pinion 20, without effect on the position of the sprocket 19. The clutch spring 58 urges clutch index ears 124 and 125 on the clutch index 50 against the faces of cams 18 and 69 respectively. The cam 69 is provided with a major radius portion extending substantially 180 degrees thereabout, minor radius portion extending substantially 90° and a spiral portion extending substantially 90°. The cam 18 is provided with a notch 126 of sufficient width to receive the ear 124. If the minor radius or spiral of cam 69 is in position to receive the ear 125 when the ear 124 aligns with notch 126, the clutch index 50 is urged counterclockwise to the position illustrated in Figs. 2 and 7, provided extension 518 has been withdrawn from tab 123. If the notch 126 is not in proper alignment, or the major radius of cam 69 is presented toward the ear 125, the clutch index 50 remains in the position illustrated in Fig. 6 without being moved thereto by the regulating lever 114.

The clutch index ear 124, upon entering the sprocket cam notch 126, locks the cam 18 against further rotation. However, the gear ratios involved are such that cam 18 may make four complete revolutions to one revolution of cam 69 so that the ear 124 may enter the notch 126 in either one of two film measuring positions: either in the position ready to advance one frame or the position ready to advance three frames. As seen in Fig. 2, the mechanism is ready to advance one frame. It can be seen that if the clutch index 50 is moved clockwise to clear the ear 124 from the notch 126, the sprocket cam 18 may make one complete revolution counter-clockwise, in which position the ear 125 will be opposite the spiral radius portion of cam 69 and the ear 124 may stop the cam 18 after one revolution. However, the next quarter revolution of cam 69 places the major radius thereof opposite the ear 125 and ear 124 will be prevented from entering slot 126 until the cam 18 completes three revolutions. Each revolution of cam 18 is accomplished by the film sprocket perforation turning the film sprocket while the film advances one frame.

For efficient film consumption, it is necessary for the film to advance only one frame after the first exposure, and to insure that the initial setting fulfills this requirement, provision is made for the automatic unlocking of the sprocket cam 18 when cam 69 is incorrectly positioned. To achieve this the regulating lever shaft spring 68 acts as a flexible coupling.

The dial 65 drives the gear 64 by a friction washer fixed to the shaft and bearing against the lower surface of gear 64. If the clutch index ear 124 engages the sprocket cam 18 when cam 69 is ready to measure one frame, counterclockwise movement of dial 65 may be made against the tension of spring 68 for substantially one-quarter turn, whereupon the pin projecting from gear 66 through the 90° slot in gear 67 strikes the end of the slot and further rotation of the knob can only be made by forcibly slipping the friction washer. If the clutch index ear 124 engages the sprocket cam 18 when cam 69 is ready to measure three frames, the 90° rotation of the regulating lever shaft cam 69, permitted by the resiliency of the spring 68, wedges the clutch lever index ear 124 out of the notch 126 due to the rotation of the spiral portion from the minor radius to the major radius contacting the index ear 125, thus permitting spring 68 to rotate cam 18 one revolution. Dial 65 may now be turned until the cams and ears are aligned again. At this position the clutch index ear 124 again drops into the sprocket cam notch 126 as before. Further rotation of the exposure counter dial 65, and the regulating lever shaft cam 69 through the 90 degrees permitted by the spring coupling 68, cannot wedge the clutch lever index ear 124 out of the notch 126 because the minor radius of the cam 69 is still presented toward the ear 125. At this point the operator will feel the drag of the friction washer and will know that the cams 18 and 69 are oriented. He then turns the exposure counter dial 65 against the resistance of the friction washer gear 64 in a clockwise direction sufficiently to bring the numeral 1 opposite the index point, indicating that the camera is ready to take the first exposure. The parts then remain in that position due to the drag of the friction washer on gear 64.

Figure 12:
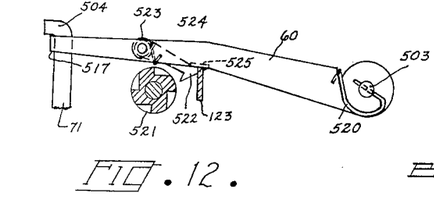
Fig. 12 is a partial plan view of a portion of the exposure counter dial mechanism.
Figure 13:
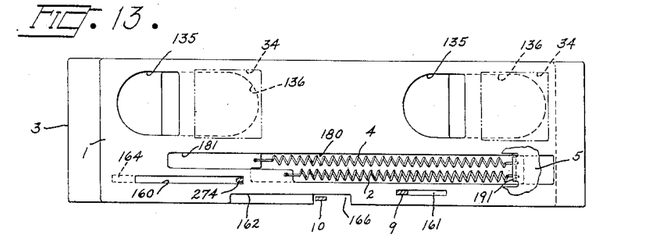
Fig. 13 is a view in elevation of the camera shutters when placed in their "Set" position ready to take an exposure.

In Fig. 12 it will be seen that the fulcrum lever 60 is mounted upon a stud 503 having a reduced end extending through the lever. A spring 520 is passed through an opening in the reduced end of the stud and is tensioned about the lever 60 to urge it in a counterclockwise direction. When the hook 504 on lever 71 is rocked clockwise, the fulcrum lever 60 is free to move in a clockwise direction when forced to do so by tab 123. The hooked end 517 of fulcrum lever 60 then passes in front of the portion 504 of lever 71, as seen in Fig. 6, to prevent the lever from returning until released to do so. In order to assure return of the fulcrum lever 60 when released, a ratchet device is provided comprising ratchet teeth 521 cut into the hub of the shaft upon which the exposure counter dial 65 is mounted. The ratchet teeth may be engaged by a hook on the end of a ratchet pawl 522 pivotally mounted upon a stud 523 depending from the fulcrum lever 60. A spring 524 is hooked about an edge of the ratchet pawl to urge it in a clockwise direction in order to be engageable with the ratchet teeth 521. When the fulcrum is in the position shown in Fig. 7 the tab 123 will be withdrawn from the position illustrated in Fig. 12, thus removing it from engagement with an ear 525 on the pawl 522 and permitting the pawl to rock clockwise to engage with the ratchet teeth. Therefore, during the operation of loading, as previously described, clockwise rotation of the exposure dial to set the numeral 1 opposite the index pointer will cause engagement of the pawl with the ratchet teeth to return the fulcrum lever 60 to its normal position. The engagement will be permitted to the extent necessary to return the fulcrum lever 60 to the position illustrated in Fig. 12, in which the ear 525 again engages the tab 123, causing counterclockwise pivoting of the pawl to remove the pawl from the ratchet teeth and permit the dial to be rotated clockwise as far as necessary to set the numeral 1 properly.

*The taking of stereoscopic pictures.*—With the selector knob remaining in the "Stereo" position, and the counter dial set at 1, the operator achieves the simultaneous exposure of a pair of pictures by depressing the trip button 133. As previously explained, this releases the escapement and the shutter blades to expose the film. The reset stop pawl 75 is disengaged from the reset cam 119 by the movement of the lever 13 and is held thereby in disengaged position. The reset knob 40 is then turned to reset the shutters and advance the film, the reset knob being no longer locked by the reset stop pawl 75. The first few degrees of rotation of the reset knob 40 permits the tab on regulating lever 74 to enter the cut-away 278 of cam 119, thus causing spring 78 to rotate lever 74 and the shaft 79 connected thereto counterclockwise to an extent sufficient to cause the extension 510 on regulating lever shaft stop 71 to engage the tab 123 on the clutch index 50 and, since the regulating lever spring 78 is much stronger than the clutch spring 58, rotate the clutch index 50 clockwise against the pressure of spring 58 far enough to carry the index ear 124 out of the sprocket cam notch 126. Simultaneously, the clutch lever 51 is rocked clockwise to cause engagement of the clutch pinion 55 with the clutch gears 43 and 44, permitting the reset knob 40 to drive the film spool 41 and thus advance the film. Movement of the film rotates the sprocket 19, engaging the film perforations, causing simultaneous rotation of the cams 18 and 69. Shortly thereafter, the recessed portion 278 of cam 119 moves beyond the regulating lever 74 and cam 119 returns lever 74 and stop 71 to their normal positions where the extension 510 of the regulating lever shaft stop 71 clears the tab 123 and the clutch is held in engagement only by the interference of cams 18 and 69 with ears 124 and 125. The recessed portion 278 extends throughout less of an arc than the arc required to move the film one frame so that releasing of the clutch index 50 occurs before the notch 126 again aligns with the ear 124. When the notch 126 aligns with the ear 124 the clutch index 50 moves counterclockwise, removing the clutch pinion 55 from the clutch gears and permitting completion of the revolution of cam 119 to reset the camera mechanism without further advance of the film, the knob 40 being locked as soon as tab 203 can enter notch 130 at the completion of one revolution of cam 119.

After the next exposure, substantially the same operation occurs except that cam 69 now interferes with movement of the clutch index ear 125 and prevents the ear 124 from entering the notch 126 until the film has been advanced three frames. As soon as this is accomplished, the ear 125 engages the minor portion of cam 69 and the ear 124 enters the notch 126 to lock the sprocket and disengage the clutch. Thereafter, the remaining portion of a revolution of cam 119 completes the resetting cycle, as previously explained.

Rotation of the sprocket 19 by the film turns the sprocket cam 18 and the regulating lever shaft cam 69 as well as the exposure counter dial 65, the gear ratios and the spacing of the successive numerals on the dial being such that the successive numerals appear opposite the fixed pointer even though the film advance is alternately one and three frames.

*The taking of single pictures.*—The camera of the present invention may be utilized for taking single exposures in the following manner: The camera is provided with a lens cap of any usual style (not shown), which may be placed over one of the lens assemblies so that releasing the shutter by depressing the trip button 133 permits exposure through the other lens assembly only. The cap is then removed and placed on the other lens assembly. The selector knob 127 is then moved to position the "Rewind" indication opposite the fixed index point. With the selector in this position the selector lever 114 is in the position illustrated in Fig. 7, having rocked the clutch lever 51 counterclockwise to disengage the clutch pinion 55, thus permitting rotation of the reset knob 40 without turning the film spool 41. The reset knob is rotated until the reset cam 119 has made one complete revolution to reset the shutters and tension the escapement spring. The trip button 133 is then depressed to take the other single exposure. Frames one and three are now exposed and, by positioning the selector knob at "Stereo" position and turning the reset knob 40 as far as possible, frames two and four are automatically positioned in the light tunnel apertures. By capping a lens as just described, a third single exposure may now be made, the reset knob turned to "Rewind" position and the shutter reset, the fourth single frame exposed, the reset knob turned to "Stereo" position and the mechanism reset with the accompanying automatic advance of the film three frames. The entire film may be exposed in single exposures in this way, or single exposures may be interspersed with stereoscopic exposures by proper manipulation of the selector dial.

*Film rewind.*—After the desired number of exposures has been taken, or the entire roll of film exposed as indicated by the counter dial, the film is rewound into the film cartridge by placing the selector knob 127 at "Rewind" which, as previously explained, disengages the clutch. Such movement of the selector releases the rewind shaft snubbing spring 39 so that the rewind knob 37 may be turned clockwise until the entire length of film is wound into the cartridge. The rewind knob 37 may then be pulled outward to disengage the rewind shaft 38 from the cartridge, and the cartridge removed from the camera.

*Operation.*—Even though the operation of the parts has been previously described, it is thought best to repeat the operation in sequence. The operator loads the film in the conventional manner by removing the camera back 89 and with the selector at "Rewind," hooking the leader into the slot in the film spool and placing the film magazine in the film magazine cavity. With the cover replaced, the selector knob 127 is turned to "Load" and the reset knob turned counterclockwise as far as possible, after making certain that the shutter controlling mechanism is released by depressing button 133. The selector knob 127 in this position causes the selector arm 114 to engage the clutch index 50 and rotate it about the ear 123 bearing on fulcrum lever 60; in so doing the pivoted end of the clutch index 50 exerts pressure on the clutch lever 51 to rotate it about the stud 501 and disengage the clutch. The reset knob 40 may now be rotated without advancing the film, the rotation being transmitted only to the reset gear 79 and reset cam 119 which turn in a clockwise direction.

The regulating lever 74, bearing on the reset cam 119, will ride on the cam surface without effect until it encounters the cam lobe 277. The cam lobe 277 will force the regulating lever 74 clockwise, the regulating lever carrying the stop lever 75 with it by reason of the latch 76. The regulating lever 74 turns the regulating lever shaft 70 until the hooked end 504 of the regulating lever stop 71 unhooks the fulcrum lever 60 and allows the fulcrum lever 60 to yield to the pressure of the clutch index ear 123. This relieves the pressure on the clutch index, permitting the clutch spring 58 to rotate the clutch lever 51 clockwise to engage the clutch so that further rotation of the reset knob 40 will advance the film. It is to be noted that this clutch engagement occurs while the reset cam notch 130 is approaching the stop lever. If the stop pawl 75 is not permitted to engage the notch 130 on this first approach, then cam 119 will be permitted to make more than one full turn before the stop pawl and cam notch once more coincide. Inasmuch as one full turn of the cam 119 is equivalent to the advance of somewhat more than three frames of film it is evident that the film spool will advance the film more than three frames which will present fresh film to the light tunnels. The stop lever 75 is not permitted to engage the cam notch 130 on the first approach by reason of the regulating lever 74 having tripped the fulcrum lever 60 which then acts as a hook against the portion 504 of regulating lever shaft stop 71 to prevent it from returning to its former position and thus holding the regulating lever 74 at the position to which it is moved by the cam lobe 277. Accordingly, because of the latch 76, the reset stop lever 75 is also held away from the cam surface.

After the cam notch 130 has passed the stop pawl as the film leader is being wound onto the film spool, the cam lobe 277 contacts the latch 76 to disengage it from the regulating lever 74 and permit the stop lever 75 to return to its active position ready to engage the notch 130. Upon completion of this revolution of the cam, it will be locked by the stop lever engaging the notch 130 and prevent further rotation of the film spool and reset knob. This completes the measuring of the film leader.

It is customary in conventional cameras to set the exposure counter dial to the numeral 1 after loading with fresh film, and this operation is also required in this camera except that it accomplishes an additional objective, namely, it insures that the first exposure will be followed by a one-frame film advance and not a three-frame advance. Before setting the exposure counter dial 65 the selector knob 127 is set to the "Stereo" position, in which position the selector arm 114 is in neutral, contacting neither the clutch lever 51 nor the clutch index 50, and so has no effect on the clutch operation. The exposure counter dial 65 may be turned counter-clockwise which, by means of the pinion 28 and gears 66 and 67, turns the regulating lever shaft cam 69 clockwise and the sprocket cam 18 counter-clockwise, the sprocket shaft 17 turning within the stationary sprocket 19 because the snubbing spring 21 does not grip the shaft in that direction of relative rotation. The clutch spring 58 urges the clutch index ears 124 and 125 against the cams 18 and 69, the ear 124 moving into the sprocket cam notch 126 when that notch is presented concurrently with the reduced area of the regulating lever shaft cam 69. When the clutch index ear 124 enters the notch 126, the cam 18 is locked against further rotation. The alignment of the two cams is such that the index ear 124 may enter its notch at either one of two film measuring positions; either in the position ready to advance one frame, or in the position ready to advance three frames. Provision is made for the automatic unlocking of the sprocket cam 18 if the film measuring mechanism is now positioned to advance three frames. To achieve this, the regulating lever shaft cam 69, the regulating lever shaft gear 66, and the regulating lever shaft lost motion gear 67 are so arranged that the cam 69 is integral with gear 67 and the two are free to rotate with respect to gear 66 for approximately 90°, being positioned only by the tension of regulating lever shaft spring 68. The spring normally permits the gear 64 to drive the gears 67 and 66 as a unit through the resilience of the spring 68. The spring is strong enough to permit the exposure counter dial 65 to drive the sprocket cam 18 against the normal friction of the parts, but upon locking of the sprocket cam 18 by the ear 124 engaging in the notch 126, further rotation of the exposure counter dial deflects the spring 68 and results in the rotation of the regulating lever shaft cam 69 through 90 degrees while gear 66 and cam 18 are held stationary. The 90-degree rotation of the regulating lever shaft cam 69 wedges the ear 124 out of the notch 126 if the 90° spiral is adjacent the ear 125. This permits continued rotation of the two cams by the dial 65 to the next position where the two cams 18 and 69 align. At this position, ear 124 engages the notch 126, but further rotation of the cam 69, as permitted by the spring 68, cannot wedge the clutch lever ear out of the notch because the spiral surface of the cam 69 does not lie in the 90° quadrant through which it is permitted to turn. At this point the operator will feel the drag caused by the friction of the spring washer against gear 64 and will know that cams 18 and 19 are oriented. He then turns the exposure counter dial 65 clockwise until the numeral 1 is opposite the index pointer. The camera is now properly loaded with all exposed leader wound past the exposure area, the film metering device set to advance one frame on the next feeding movement, the shutter and escapement mechanism tensioned in "Set" position, and the exposure dial set at the numeral 1.

In order to take stereoscopic pictures, the operator presses the button 133 which moves the release lever 16 and the release lever 13 to disengage the primary latch pawl 134. The primary latch pawl is urged in a counter-clockwise direction by the escapement spring 14 and in so doing drives the escapement gears and effects the release of the shutter blades to expose the film. The reset stop pawl 75 is disengaged from the reset cam 119 by the lever 13 and held in releasing position by the movement of the primary latch pawl 134 past the face of the lever 13. The shutter may be reset and the film advanced by turning the reset knob 40. This rotates the reset cam 119 to permit the regulating lever 74 to enter the cut-away section 278, rotating the regulating lever shaft 70 far enough to cause the portion 510 on the regulating lever shaft stop 71 to strike the ear 123 on the clutch index 50, and since the regulating lever spring 78 is much stronger than the clutch spring 58, to move the clutch index 50 and thereby withdraw the ear 124 from the notch 126 and engage the clutch. This permits the reset knob 40 to drive the film spool and advance the film. Thus film advancing movement is initiated immediately after initiation of a resetting cycle. Movement of the film rotates the cams 18 and 69. Shortly thereafter the reduced section 278 of cam 119 passes beyond the regulating lever 74, which is returned to its normal position where the portion 510 no longer engages the ear 123. The clutch index 50, however, is held in clutch engaging position by the interference of cams 18 and 69 with the ears 124 and 125. The cam 18 will soon have made one complete revolution corresponding to the advance of one frame of film and the ears 124 and 125 will engage the reduced portions of the aligned cams, disengaging the clutch and locking the sprocket 19 against further rotation. Additional rotation of the reset knob 40 continues revolution of the reset cam 119 until the stop pawl engages the notch 130 to prevent further rotation of the reset knob. The shutter blades and escapement are returned to "Set" position during this complete revolution of cam 119. The exposure counter dial has been moved to set the numeral 2 opposite the index by the one revolution of cam 18. Upon the next depression of button 133 and rotation of the reset knob, the same operation is repeated except that cam 69 prevents return of the clutch index to unclutching position until cam 18 has made three complete revolutions corresponding to the advance of three frames. During this advance the dial moves to position the numeral 3 opposite the index pointer.

It is also possible to take single pictures by capping one lens, thus permitting exposure of only one frame of the pair normally exposed. After the first exposure, the operator changes the cap to the other lens and resets the shutter without advancing the film by setting the selector knob 127, to "Rewind" and turning the reset knob 40 as far as possible. This results in moving the selector arm 114 into engagement with the clutch lever 51, holding it in counter-clockwise direction and forcibly disengaging the clutch.

Complete rotation of knob 40 therefore results solely in resetting of the shutter mechanism. The second single picture may now be taken and the film advanced by placing the selector knob 127 at "Stereo" and turning the reset knob 40 as far as possible. If additional single pictures are desired, the foregoing procedure may be repeated.

After the desired number of pictures have been taken, the film is rewound into the magazine by placing the selector knob 127 at "Rewind," which disengages the clutch. At the same time the selector arm 114 untensions the rewind shaft snubbing spring 39, which permits the rewind shaft to be turned in clockwise direction until the entire exposed length is wound inside the film cartridge. The cartridge may then be removed by pulling the rewind knob 37 outward while the spring 39 is held in released position by the selector.

*Conclusion.*—Having illustrated and described a preferred embodiment of my present invention, it should be apparent to those skilled in the art that the invention permits of modification in detail and arrangement. All such modifications as come within the true spirit and scope of the appended claims are considered to be a part of my invention.

I claim:

1. A film measuring device for a camera comprising a sprocket engaging the film, a first control member rotated by said sprocket upon film advance, film advancing means including a clutch, a clutch index engaging said first control member and movable thereby to clutch disengaging position after a single frame of film has advanced, a second control member rotated by said sprocket, and means on said clutch index engaging said second control member to render said clutch index ineffective at every alternate film advance until the alternate film advance has resulted in the movement of a plurality of film frames.

2. In a film advance mechanism for a camera, a clutch operating member having a first cam follower and a second cam follower thereon, a first cam having a notch capable of receiving said first cam follower, a second cam having a minor radius portion capable of receiving said second cam follower to permit the movement of said first cam follower into said notch, the remainder of said second cam preventing such movement, means normally coupling said cams for simultaneous rotation, with said first cam making four revolutions to one of said second cam, and means permitting independent movement of said second cam through a fraction of a revolution when said first cam follower is engaged in said notch.

3. A film advancing and measuring device including a rotatable member, a film spool adapted to be clutched to said member for rotation therewith, a clutch for engaging said member with said film spool, clutch operating means movable by the advancing film for disengaging said clutch after a predetermined amount of film has advanced comprising a clutch controlling element normally movable through a clutch engaging and disengaging cycle during the advance of a unit of film, and means movable into engagement with said clutch controlling element by the advancing film for rendering said element ineffective to disengage said clutch at each alternate advance of the film until advance of a plurality of film units has occurred.

4. In a camera, shutter resetting mechanism, film advancing mechanism, clutch means movable to clutching position such that said mechanisms are interconnected whereby operation of said resetting mechanism is accompanied by operation of said film advancing mechanism, clutch controlling means including a film measuring device and cam means rotated by said film measuring device to operate said clutch controlling mechanism to disengage said clutch alternately upon advance of a short length of film and upon advance of a long length of film, an exposure indicator operated by said film measuring device for indicating the number of exposures, a friction connection between said indicator and said film measuring device whereby said indicator may be set at a starting position without moving the film, and means interconnecting said indicator and said cam means to set said cam means when said indicator is moved to the starting position in such position with respect to said clutch controlling mechanism as to cause disengagement of said clutch after advance of a short length of film upon the first actuation of said film advancing means after setting said exposure indicator at its starting position.

5. In a stereoscopic camera, means for exposing simultaneously a pair of frames of film separated by an unexposed frame, a manually rotatable knob, camera resetting mechanism connected to said knob and movable thereby through a resetting cycle, film advancing means, a clutch which upon engagement connects said film advancing means to said knob, means actuated by said resetting mechanism to engage said clutch upon initiation of a cycle of said resetting mechanism, clutch controlling means movable by the advancing film to disengage said clutch during each cycle of said resetting mechanism alternately after an advance of a single unit of film or of a plurality of units of film, a film cartridge chamber and a film receiving chamber separated a distance such that upon loading the camera a leader of more than three film frames is exposed, and manually movable means movable to block said clutch controlling means whereby to prevent disengagement of said clutch during the initial resetting cycle after loading the camera so that initial resetting of the camera may be accompanied by a film movement of more than three frames in order to advance the exposed leader.

6. In a stereoscopic camera, means for exposing simultaneously a pair of frames of film separated by an unexposed frame, a manually rotatable knob, camera resetting mechanism connected to said knob and movable thereby through a resetting cycle, film advancing means, a clutch which upon engagement connects said film advancing means to said knob, means actuated by said resetting mechanism to engage said clutch upon initiation of a cycle of said resetting mechanism, clutch controlling means movable by the advancing film to disengage said clutch during each cycle of said resetting mechanism alternately after an advance of a single unit of film or of a plurality of units of film, a film cartridge chamber and a film receiving chamber separated a distance such that upon loading the camera a leader of more than three film frames is exposed, manually selectable means to prevent disengagement of said clutch during the initial resetting cycle after loading the camera whereby initial resetting of the camera may be accompanied by a film movement of more than three frames to advance the exposed leader, an exposure indicator operated by the advancing film for indicating the number of exposures, a friction connection between said indicator and said controlling means whereby said indicator may be set at a starting position without affecting said controlling means, and means connected to said indicator and movable thereby when being set at the starting position to condition said controlling means to disengage said clutch after advance of a single frame of film during the next resetting operation.

7. In a roll film camera, means for advancing the film including a manual knob, a film advancing clutch member movable into clutching engagement with said knob, resetting mechanism fixed to and actuated by said knob, shifting mechanism for shifting said clutch member from and to clutching position, means actuated by said resetting mechanism and connected to said shifting mechanism for shifting said clutch member to clutching position upon initiation of operation of said resetting means, manually positionable clutch controlling mechanism movable to a plurality of positions, means rotated by the film and engageable with said shifting mechanism to move said clutch member to unclutching position alternately after advance of one and three frames of film at each resetting operation when said clutch controlling mechanism is moved to one position with relation to said clutch shifting mechanism, and means movable by said clutch controlling mechanism when moved to another position to disengage said clutch shifting mechanism from said film measuring mechanism to permit a film advance of more than three frames during a resetting operation.

8. In a roll film camera, means for advancing the film including a manual knob, a film advancing clutch member movable into clutching engagement with said knob, resetting mechanism fixed to and actuated by said knob, shifting mechanism for shifting said clutch member from and to clutching position, means actuated by said resetting mechanism and connected to said shifting mechanism for shifting said clutch member to a clutching position upon initiation of operation of said resetting means, manually positionable clutch controlling mechanism movable to a plurality of positions, film measuring mechanism actuated by the film and engageable with said shifting mechanism to move said clutch member to unclutching position alternately after advance of one and three frames of film at each resetting operation when said clutch controlling mechanism is moved to one position with relation to said shifting mechanism, means movable by said clutch controlling mechanism when moved to another position to disengage said shifting mechanism from said film measuring mechanism to permit a film advance of more than three frames during a resetting operation, a rewind knob, snubbing means normally preventing said rewind knob from rotating in a direction to rewind the film, means connected to said controlling mechanism for disengaging said snubbing means from said rewind knob when said controlling mechanism is set at a third position, and means to disengage said clutch when said controlling mechanism is moved to said third position.

9. In a camera of the class described, the combination with a take-up spool positioned in one end of said camera, a winding knob operatively connectable with said spool to rotate the latter to wind film thereon, a clutch including a driving gear, a driven gear and a clutch pinion positionable in mesh with said driving gear and said driven gear to effect operative connection of said knob to said spool or out of mesh therewith to permit rotation of said knob without effecting rotation of said spool, a clutch pinion lever, carrying said clutch pinion, pivotally mounted in said camera and movable to a clutch engaging position in which said clutch pinion is in mesh with said gears or to a clutch disengaging position in which said clutch pinion is disengaged from said gears, a clutch lever pivotally connected to said clutch pinion lever for effecting movement thereof, manually selectable means engageable with said clutch lever in one selected position to shift said clutch lever, clutch pinion lever and clutch pinion to positions such that said clutch pinion is disengaged, spring means biased between said camera and said clutch lever to move said clutch lever, clutch pinion lever and clutch pinion to positions such that said clutch pinion is engaged when said clutch lever is released from said manually selectable means, shutter means in said camera releasable at will to effect an exposure, shutter resetting means interconnecting said winding knob with said shutter means and normally movable through a complete cycle by said winding knob to reset said shutter means, a film-engaged member rotatable by the film when moved during winding thereof upon said spool, and clutch lever controlling means comprising a clutch index pivoted to said clutch lever and rotatable clutch index shifting means driven by said rotatable member and engaging said clutch index to shift said clutch lever, clutch pinion lever and clutch pinion to disengaging positions at a selected point in the cycle of operation of said resetting means after being moved to engaging positions by said spring means.

10. The structure set forth in claim 9, in which said rotatable clutch index shifting means comprises a pair of recessed discs and gear means between said discs driving one from the other in ratio of one to four.

11. The structure set forth in claim 9, in which said rotatable clutch index shifting means comprises a pair of recessed discs and gear means between said discs driving one from the other, and said clutch index comprises a pair of tabs each engageable in a recess of one of said discs to shift said clutch index when said recesses are aligned with both tabs.

12. In a camera, film advancing mechanism including a winding shaft, a manual knob and a clutch for connecting said knob to said shaft, a clutch lever for engaging and disengaging said clutch, said clutch lever being pivotally mounted in said camera, first spring means biased to urge said clutch lever in a clutch engaging direction, second spring means biased to urge said clutch lever in a clutch disengaging direction, said second spring means being stronger than said first spring means and capable of overcoming said first spring means, a clutch index lever having a fulcrum thereon about which said clutch lever may pivot when urged by said second spring means, a tab on said clutch index lever, a notched disc engaging said clutch index lever tab for holding said fulcrum in position to cause said clutch lever to pivot to engaging position under the influence of said second spring means, and means engaged by the film to rotate said notched disc and position the notch thereof in alignment with said clutch index lever tab whereby said fulcrum is displaced and said clutch lever may thereupon be moved to disengaging position by said first spring means.

13. In a camera, a film advancing mechanism including a winding shaft, a manual knob and a clutch for connecting said knob to said shaft, a clutch lever for engaging and disengaging said clutch, said clutch lever being pivotally mounted in said camera, first spring means biased to urge said clutch lever in a clutch engaging direction, second spring means biased to urge said clutch lever in a clutch disengaging direction, said second spring means being stronger than said first spring means and capable of overcoming said first spring means, a clutch index lever having a fulcrum thereon about which said clutch lever may pivot when urged by said second spring means, a first tab on said clutch index lever, a notched disc engaging said first clutch index lever tab for holding said fulcrum in position to cause said clutch lever to pivot to engaging position under the influence of said second spring means, means engaged by the film to rotate said notched disc and position the notch thereof in alignment with said first clutch index lever tab whereby said fulcrum is displaced and said clutch lever may thereupon be moved to disengaging position by said first spring means, a second tab on said clutch index lever, cam means engaging said second clutch index lever tab, and gears connecting said notched disc and said cam means and driving said cam means at a reduced rate of rotation, said cam means having a low portion of such extent as to permit said first clutch index lever tab to enter said notch at the completion of two successive rotations of said notched disc and a high portion of such extent as to prevent said first clutch index lever tab from entering said notch on the next two successive rotations of said notched disc.

14. In a camera, a film advancing mechanism including a winding shaft, a manual knob and a clutch for connecting said knob to said shaft, a clutch lever for engaging and disengaging said clutch, said clutch lever being pivotally mounted in said camera, first spring means biased to urge said clutch lever in a clutch engaging direction, second spring means biased to urge said clutch lever in a clutch disengaging direction, said second spring means being stronger than said first spring means and capable of overcoming said first spring means, a clutch index lever having a fulcrum thereon about which said clutch lever may pivot when urged by said second spring means, a pair of tabs on said clutch index lever, a notched disc engaging one of said clutch index lever tabs for holding said fulcrum in position to cause said clutch lever to pivot to engaging position under the influence of said second spring means, means engaged by the film to rotate said notched disc and position the notch thereof in operative relation to said one clutch index lever tab whereby said fulcrum is displaced and said clutch lever may thereupon be moved to disengaging position by said first spring means, cam means engaging the other of said clutch index lever tabs, four to one reduction gears connecting said notched disc and said cam means and driving said cam means, said cam means having a low portion of such extent as to permit said one clutch index lever tab to enter said notch at the completion of two successive rotations of said notched disc and a high portion of such extent as to prevent said one clutch index lever tab from entering said notch on the next two successive rotations of said notched disc, and a manually positionable selector lever engageable with said clutch index lever in one position to hold said one clutch index lever tab from entering said notch.

15. In a camera, a film advancing mechanism including a winding shaft, a manual knob and a clutch for connecting said knob to said shaft, a clutch lever for engaging and disengaging said clutch, said clutch lever being pivotally mounted in said camera, first spring means biased to urge said clutch lever in a clutch engaging direction, second spring means biased to urge said clutch lever in a clutch disengaging direction, said second spring means being stronger than said first spring means and capable of overcoming said first spring means, a clutch index lever having a fulcrum thereon about which said clutch lever may pivot when urged by said second spring means, a pair of tabs on said clutch index lever, a notched disc engaging one of said clutch index lever tabs for holding said fulcrum in position to cause said clutch lever to pivot to engaging position under the influence of said second spring means, and means engaged by the film to rotate said notched disc and position the notch thereof in operative relation to said one clutch index lever tab whereby said fulcrum is displaced and said clutch lever may thereupon be moved to disengaging position by said first spring means, cam means engaging the other of said clutch index lever tabs, four to one reduction gears connecting said notched disc and said cam means and driving said cam means, said cam means having a low portion of such extent as to permit said one clutch index lever tab to enter said notch at the completion of two successive rotations of said notched disc and a high portion of such extent as to prevent said one clutch index lever tab from entering said notch on the next two successive rotations of said notched disc, a manually positionable selector lever engageable with said clutch index lever in one position to hold said one clutch index lever tab from entering said notch, and means connected to said knob and movable thereby to shift said clutch lever to disengaging position while said one clutch index lever tab is held from entering said notch by said selector lever.

GORDON N. SMITH.

REFERENCES CITED

The following references are of record in the file of this patent:

UNITED STATES PATENTS

| Number | Name | Date |
|---|---|---|
| 2,090,017 | Young | Aug. 17, 1937 |
| 2,169,001 | Mihalyi | Aug. 8, 1939 |
| 2,194,284 | Kuppenbender | Mar. 19, 1940 |
| 2,227,964 | Drotning | Jan. 7, 1941 |
| 2,245,213 | Mihalyi | June 10, 1941 |
| 2,335,402 | Friebe | Nov. 30, 1943 |
| 2,345,999 | Babcock | Apr. 4, 1944 |
| 2,385,183 | Avers | Sept. 18, 1945 |
| 2,385,804 | Fitz | Oct. 2, 1945 |